United States Patent [19]

Teale

[11] Patent Number: 5,704,838

[45] Date of Patent: Jan. 6, 1998

[54] DOWN-HOLE MOTOR UNIVERSAL JOINT

[75] Inventor: David W. Teale, Houston, Tex.

[73] Assignee: Drilex Systems, Inc., Houston, Tex.

[21] Appl. No.: 444,227

[22] Filed: May 18, 1995

[51] Int. Cl.$^6$ ............................................. F16D 3/221
[52] U.S. Cl. ........................... 464/19; 464/143; 464/906
[58] Field of Search ..................... 464/143, 141, 464/18, 19, 15, 139, 140, 106, 155, 152, 147, 906

[56] References Cited

U.S. PATENT DOCUMENTS

| | | | |
|---|---|---|---|
| 2,653,456 | 9/1953 | Heym | 464/906 X |
| 3,260,069 | 7/1966 | Neilson et al. | 464/19 X |
| 3,906,746 | 9/1975 | Haines . | |
| 4,004,435 | 1/1977 | Rubin . | |
| 4,501,511 | 2/1985 | Albert, Jr. . | |
| 4,772,246 | 9/1988 | Wenzel . | |
| 4,904,228 | 2/1990 | Frear et al. . | |
| 4,982,801 | 1/1991 | Zitka et al. | 464/155 X |
| 5,000,723 | 3/1991 | Livingstone | 464/141 X |
| 5,007,491 | 4/1991 | Ide | 464/147 X |
| 5,267,905 | 12/1993 | Wenzel et al. | 464/141 X |
| 5,334,096 | 8/1994 | Iwao . | |
| 5,503,236 | 4/1996 | Tibbitts | 464/19 X |

FOREIGN PATENT DOCUMENTS

| | | |
|---|---|---|
| 1135509 | 8/1983 | U.S.S.R. . |
| 270795 | 5/1927 | United Kingdom . |
| 408660 | 4/1934 | United Kingdom . |
| 577212 | 5/1946 | United Kingdom . |
| 863378 | 3/1961 | United Kingdom . |
| 2019531 | 10/1979 | United Kingdom . |
| 1599204 | 9/1981 | United Kingdom . |
| 2131519 | 6/1984 | United Kingdom . |

*Primary Examiner*—Daniel P. Stodola
*Assistant Examiner*—Eileen A. Dunn
*Attorney, Agent, or Firm*—Russell D. Culbertson; Shaffer & Culbertson

[57] ABSTRACT

A universal joint assembly (12) includes a coupling hub member (26) and a female coupling member (24). The female coupling member (24) includes a receptacle (28) at one end for receiving a pivot end (30) of the coupling hub member (26). The joint (12) includes a central bearing structure (34) interposed between the coupling hub member (26) and female coupling member (24) for enabling the coupling members to pivot up to a maximum pivot angle with respect to each other about a coupling axis. The universal joint (12) also includes a plurality of torque transmitting rollers (50), each received in a different roller slot and spaced apart about the periphery of the coupling hub member (26) near its pivot end (30). The roller slots are formed on both the coupling hub member (26) and female coupling member (24) and enable the torque transmitting rollers (50) to transmit torque between the coupling members while rolling with respect to the roller surfaces as the coupling members pivot about the coupling axis. The universal joint (12) also includes a spherical central bearing structure and a spherical seal structure (60) associated with the coupling hub member (26). Also, each universal joint (12) employed in a down-hole mud motor is oriented in the mud motor with the receptacle (28) of the female coupling member (24) facing downwardly away from the direction of fluid flow through the motor.

10 Claims, 3 Drawing Sheets

DOWN-HOLE MOTOR UNIVERSAL JOINT

BACKGROUND OF THE INVENTION

This invention relates to universal joints, and more particularly to universal joints used in mud motors and other high torque applications.

Down-hole mud motors are used to apply torque to a drill bit in oil and gas wells and other drilling applications. The mud motor is placed at the bottom of the drill string with the drill bit connected to the bottom of an output shaft. Drilling fluid or "mud" pumped through the drill string flows through the mud motor, and the motor uses the force of the fluid to produce a mechanical output to rotate the output shaft and the drill bit.

Although there are different types of mud motors, the most commonly used type today is a positive displacement motor which uses an elongated, helically-shaped rotor within a corresponding helically shaped stator. The flow of drilling fluid or mud between the stator and rotor causes the rotor to orbit within the stator eccentrically about the longitudinal axis of the stator. The rotor itself rotates about its longitudinal axis and also orbits around the central longitudinal axis of the stator. This eccentric orbit and rotation of the rotor must still be transferred by a suitable transmission assembly to produce a concentric rotation for the output shaft.

Universal joint assemblies, commonly referred to as U-joints, are required in order to transfer the eccentric orbit and rotation of the rotor to the concentric rotation of the output shaft to drive the drill bit. The output end of the rotor is connected to one U-joint, and a shaft connects the first U-joint to a second. This second U-joint is connected to a concentrically rotating output shaft.

In addition to transferring the eccentric rotation of the rotor to a concentrically rotating shaft, down-hole mud motors may require other U-joints. For example, a mud motor may be designed with a bent housing for use in directional drilling. Mud motors may also include a mechanism by which the housing may be bent at a suitable angle for a particular directional drilling effect. In either case, a U-joint may be required to traverse the bend in the housing.

Regardless of how a U-joint is used in a down-hole mud motor, such U-joints are subjected to very high torques and operate in a very hostile environment. One major problem with down-hole mud motor U-joint design is wear between the torque transferring surfaces in the joint. The wear is due to the rubbing action between the torque transferring elements in the joint as the joint members articulate.

U.S. Pat. No. 5,267,905 to Wenzel et al is an example of a prior art U-joint assembly for a down-hole mud motor. The Wenzel device includes articulating joint members with a series of peripherally spaced balls transmitting torque from one member to the other. The torque transmitting balls provide a positive coupling between the two joint members. However, the balls are each held within a dimple formed in one of the joint members and therefore must rotate with respect to the dimple surface as the joint articulates. This rubbing action between the torque transmitting ball and the dimple in which it is held can cause excessive wear to the ball and the dimple, eventually damaging the joint.

Another problem with prior mud motor U-joints involves the seal structure that protects the bearing surfaces within the joint. Seals for U-joints used in mud motor applications must allow smooth articulation as the joint rotates, while protecting the internal bearing surfaces of the joint from extreme pressure, pressure variations, and high velocity drilling fluid.

SUMMARY OF THE INVENTION

It is therefore a general object of the invention to provide a U-joint assembly that overcomes the above-described problems and others associated with U-joints, particularly U-joints used in down-hole mud motors and other high torque applications.

In order to accomplish this object, a U-joint according to the invention transfers torque between the articulating joint or coupling members without requiring that the torque transmitting surfaces rub together as the joint articulates. Rather, torque is transmitted through rollers which are in only rolling contact with the coupling members as the joint articulates.

The joint according to the invention comprises a female coupling member and a coupling hub member. The female coupling member includes a bore or receptacle at one end, and the coupling hub member has a pivot end received in the female coupling member receptacle. A central bearing structure between the female coupling and coupling hub members allows the two members to pivot about a coupling axis with respect to each other.

Torque is transmitted between the coupling hub and female coupling members through rollers spaced apart about the periphery of the coupling hub member. Associated with each roller is a roller surface structure or means formed in the coupling hub member and the female coupling member. Each roller surface structure defines a roller receiving space and comprises elongated slots formed in both the coupling hub and female coupling members which facilitate rolling contact with the roller received therebetween. The rolling contact is maintained between both the coupling hub and female coupling members throughout the entire angle at which the members pivot about the coupling axis. This rolling contact between the torque transmitting members, or rollers, and the coupling hub and female coupling members greatly reduces wear and allows for smoother articulation in the U-joint.

The central bearing structure of the present U-joint also facilitates smooth articulation with minimal wear. The preferred central bearing structure includes a spherical bearing member interposed between removable bearing seats, both with concave, spherically-shaped bearing surfaces. The central bearing structure also supports any axial thrust load applied to the U-joint during operation.

In addition to the rolling torque transfer arrangement and central bearing structure, the preferred seal used in the U-joint according to the invention also facilitates smooth articulation in the hostile environment encountered in a down-hole mud motor. The seal structure includes a spherical seal surface formed on the coupling hub member with a center of curvature coinciding with the coupling axis. An annular seal element fits in an annular space between the spherical seal surface of the coupling hub member and the receptacle surface of the female coupling member to provide the seal. A seal carrier structure holds the sealing element in place and completes the sealing contact with the spherical seal surface and the female coupling member. The spherical seal contact facilitates a good seal between the coupling hub member and female coupling member throughout the articulating range of the joint.

In another aspect of the invention, each U-joint in the transmission assembly is positioned within the mud motor housing to protect the seal arrangement from drilling fluid pumped through the mud motor. All U-joints are positioned within the mud motor housing with the receptacle of the female coupling member facing downward toward the output end of the mud motor. In this downward faring position, the body of the female coupling member protects the seal structure from the impact of drilling fluid that moves at high velocity between the U-joint and the mud motor housing.

These and other objects, advantages, and features of the invention will be apparent from the following description of the preferred embodiments, considered along with the accompanying drawings.

DESCRIPTION OF THE PREFERRED EMBODIMENTS

Figure 1:
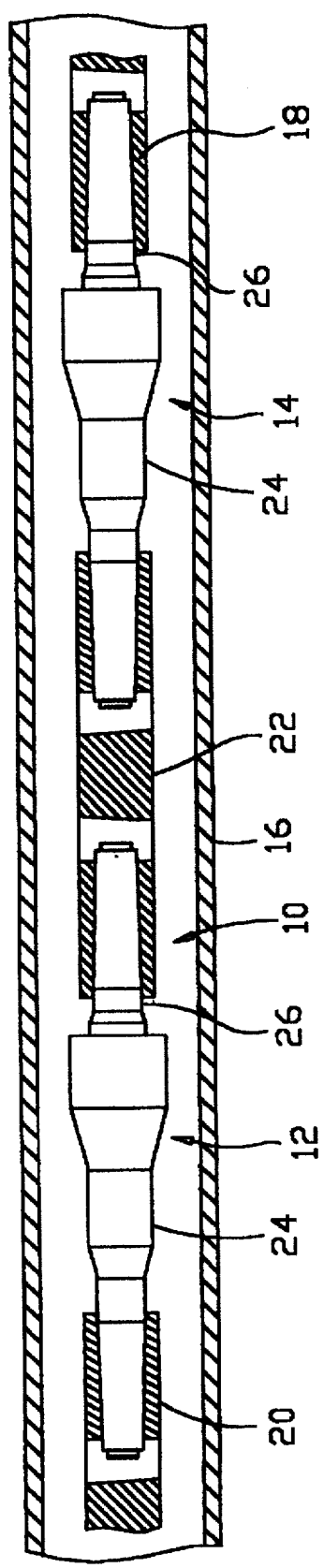
FIG. 1 is a broken longitudinal elevation and partial longitudinal section view of a mud motor transmission assembly embodying the principles of the invention.

FIG. 1 shows a mud motor transmission assembly 10 including U-joints 12 and 14 embodying the principles of the invention. The transmission assembly 10 is contained within the mud motor housing 16, shown only in section in FIG. 1, and is connected at one end to an output shaft 18 and at its opposite end to the mud motor rotor 20. A center shaft 22 connects the two U-joints 12 and 14. Those skilled in the art will appreciate that the illustrated application is only one application for U-joints in a mud motor. A U-joint according to the invention may also be used to traverse a bend in a fixed or adjustable bent housing of a mud motor or to traverse any articulated element of a mud motor or the like.

Figure 2:
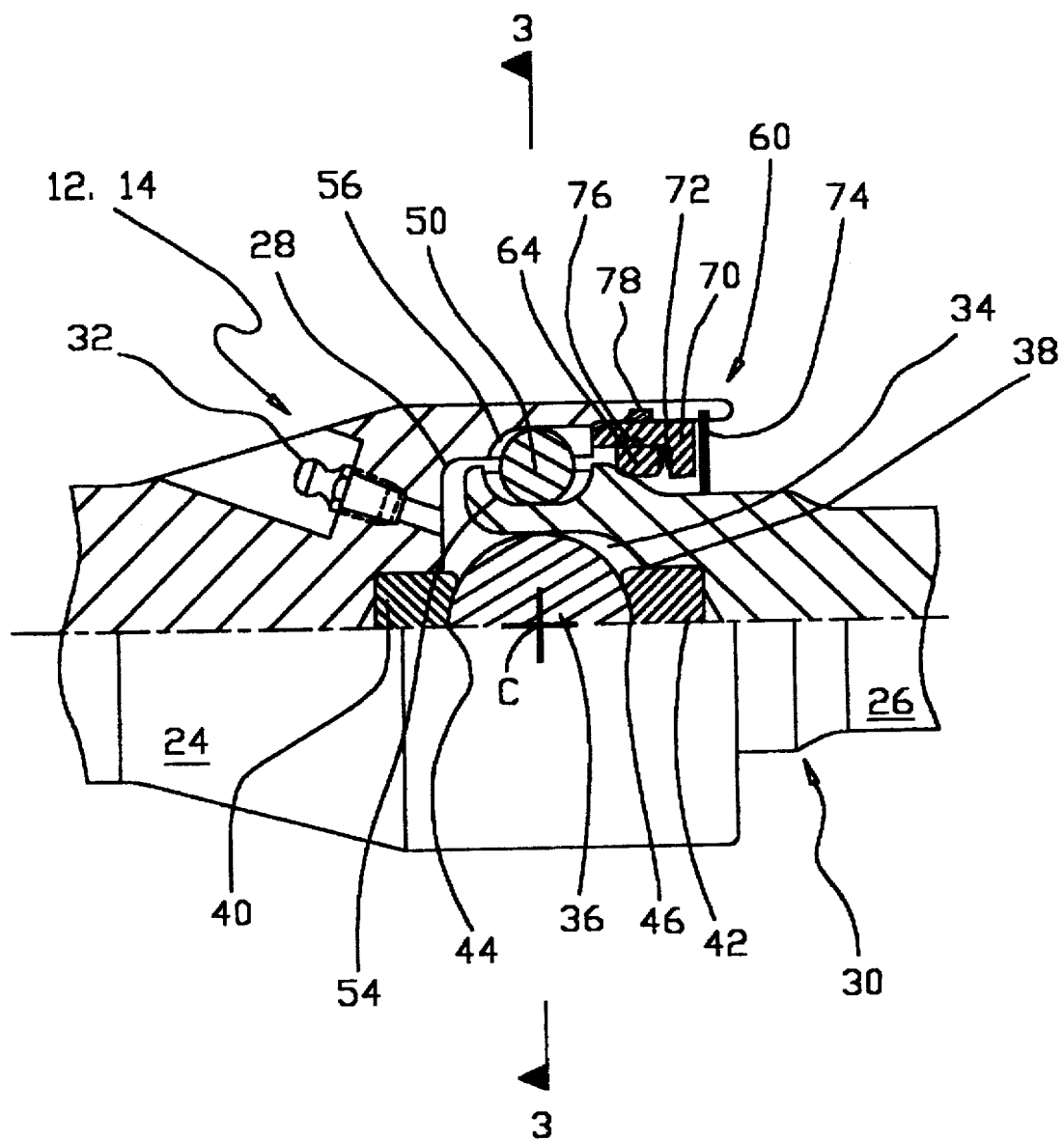
FIG. 2 is an enlarged broken longitudinal elevation and longitudinal section view of one of the U-joints shown in FIG. 1.

The U-joints 12 and 14 are identical and each includes a female coupling member 24 and a coupling hub member 26. Referring to FIG. 2, the female coupling member 24 includes a receptacle 28 at one end for receiving a pivot end 30 of the coupling hub member 26. The female coupling member 24 also preferably includes a grease fitting 32 or some other means through which lubricant may be injected into the joint to lubricate the enclosed bearing and articulating surfaces.

As best shown in FIG. 2, each U-joint 12 and 14 includes a central bearing structure or means shown generally at reference number 34 that enables the female coupling member 24 and coupling hub member 26 to pivot with respect to each other about a coupling axis shown at point C. The central bearing structure 34 also supports any axial thrust load applied to the U-joint. Although any bearing structure may be employed in the U-joint 12, 14 according to the invention, the preferred structure includes a spherical bearing member 36 interposed between the female coupling member 24 and coupling hub member 26 and contained in an opening 38 at the pivot end 30 of the coupling hub member 26. Replaceable ball seats 40 and 42 are mounted on the female coupling member 24 and coupling hub member 26, respectively, each including a spherically-shaped, concave surface 44 and 46 having a radius of curvature corresponding generally to the radius of curvature of the spherical bearing member 36. The two concave surfaces 44 and 46 face each other, forming a space within which the spherical bearing member 36 is received. The ball seats 40 and 42 and spherical bearing member 36 may be made of a suitable material such as AISI 52100, which provides long lasting, smooth operation as the two members 24 and 26 pivot about the coupling pivot axis C.

Torque is transferred between the female coupling member 24 and coupling hub member 26 by a plurality of spherical torque transferring rollers 50 spaced apart about the periphery of the coupling hub member 26. Each torque transmitting roller 50 is associated with roller surface means formed on both the female coupling member 24 and coupling hub member 26.

Figure 3:
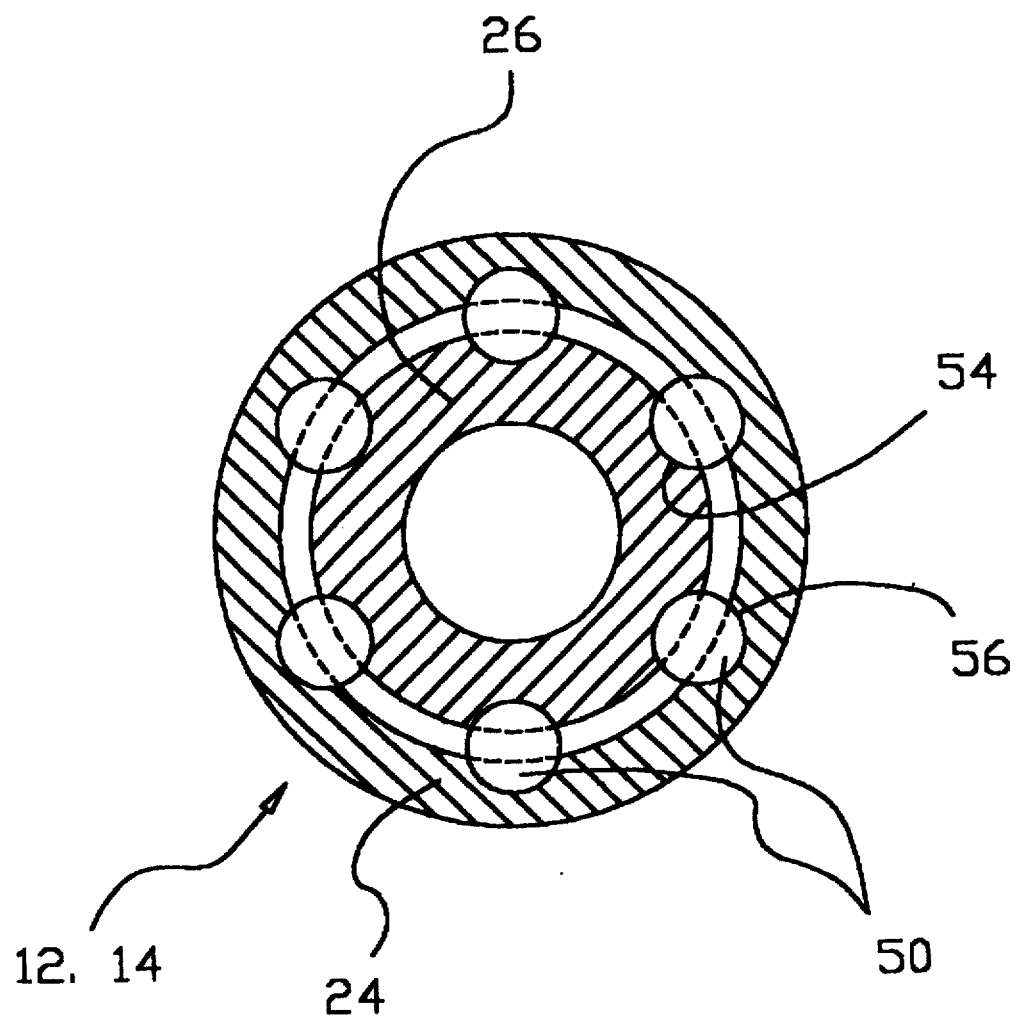
FIG. 3 is a view in transverse section taken along line 3—3 in FIG. 2.

Each roller surface means includes an inner roller slot 54 formed on an outer surface of the coupling hub member 26 and an outer roller slot 56 formed in the surface of the female coupling member receptacle 28. The slots 54 and 56 are aligned radially about the longitudinal axis of the coupling hub 26 and overlap to form a roller receiving area for the roller 50 used. As shown in FIG. 3, the roller slots 54 and 56 both have a generally semicircular transverse cross-sectional shape corresponding to the shape of the spherical roller. Depending upon the maximum angle at which the joint must articulate about the coupling axis C, the roller slots may be straight for small angles, or curved about the coupling axis C for larger angles, angles above 6 degrees for example. For angles below 6 degrees, the curvature required may be less than the manufacturing tolerances of the joint, which would allow straight slots to be used.

The central bearing structure 34 and roller 50 arrangements are all protected from drilling mud flowing around the U-joint 12, 14 by a seal structure 60 between the coupling hub member 26 and the female coupling member 24. The seal structure or means 60 includes an annular convex spherical surface 62 formed on the coupling hub member 26 with a center of curvature corresponding to the coupling axis C. The seal structure 60 also includes a seal element 64 and a seal carrier arrangement. The seal element 64 includes a concave spherical or beveled surface mating with and providing a seal against the annular convex spherical seal surface 62. The seal carrier arrangement includes a carrier member 70, biasing means preferably comprising a Belleville spring 72 and a retaining ring 74. The retaining ring 74 holds the carrier member 70 in place, and the biasing means 72 acts between the carrier member and seal element 64 to continuously press the seal element into a sealing relationship against the spherical seal surface 62 on the coupling hub member 26. An inner O-ring 76 seals between the seal carrier 70 and seal element 64 and an outer O-ring 78 seals between the seal carrier 70 and the receptacle wall of the female coupling member. The O-rings 76 and 78 complete the seal structure 60.

The operation of the U-joint 12, 14 and torque transmission method according to the invention may now be described with particular reference to FIGS. 2 and 3. As the female coupling member 24 and coupling hub 26 pivot with respect to each other about pivot axis C, the torque transmitting rollers 50 roll along the inner and outer roller slots 54 and 56 in the coupling hub member 26 and female coupling member 24, respectively. That is, as the joint 12, 14 articulates, the only contact between the torque transmitting members 50 and the two coupling members 24 and 26 is a rolling contact with the torque transmitting rollers rolling along the surface of the two slots 54 and 56. The roller 50 and roller surface or slot arrangement eliminates any rubbing action between torque transmitting members as the U-joint 12, 14 articulates, and thus reduces wear in the torque transmitting structure and allows smooth operation as the joint rotates.

Also, as the female coupling member 24 and coupling hub 26 pivot about the coupling axis C, the seal structure 60 provides a continuous seal between the receptacle 28 of the female coupling member 24 and the outer surface of the coupling hub member 26. Since the spherical seal surface 62 has a center curvature corresponding to the coupling pivot axis C, the seal element 64 need not deform as the joint 12, 14 articulates. This not only facilitates very smooth operation, but also facilitates the use of a metal or very rigid sealing element 64 that provides long lasting operation.

According to another aspect of the invention, and referring back to FIG. 1, both U-joints 12 and 14 contained within the mud motor transmission assembly 10 are aligned with the female coupling member receptacle 28 facing downwardly and away from the direction of drilling fluid flow through the mud motor. This orientation of the U-joints 12 and 14 according to the invention allows the body of the female coupling member 24 to block the high velocity fluid flowing within the housing 16 from striking the seal structure 60, thereby protecting the seal structure from the drilling fluid and abrasives it invariably contains.

The above described preferred embodiments are intended to illustrate the principles of the invention, but not to limit the scope of the invention. Various other embodiments and modifications to these preferred embodiments may be made by those skilled in the art without departing from the scope of the following claims. For example, the female coupling member 24 and coupling hub member 26, as well as the other components of the U-joints 12 and 14, may be made of any suitable material, such as stainless steel. Also, other seals, seal carrier arrangements, and bearing structures may be used in the U-joints 12 and 14 within the scope of the invention.

I claim:

1. A universal joint assembly comprising:
   (a) a female coupling member having a receptacle at a first end thereof, the receptacle being aligned co-axially with a female coupling member longitudinal axis;
   (b) a coupling hub member having a pivot end received in the female coupling member receptacle;
   (c) a central bearing member positioned between a thrust bearing surface of the female coupling member and a thrust bearing surface at the pivot end of the coupling hub member, the coupling hub member and female coupling member being adapted to pivot with respect to each other up to a maximum pivot angle about a coupling axis associated with the central bearing member;
   (d) a plurality of elongated outer roller slots circumferentialy spaced apart on the inner surface of the female coupling member defining the receptacle, the longitudinal axis of each outer roller slot extending substantially parallel to the female coupling member longitudinal axis and each outer roller slot having a substantially semicircular shape in transverse cross section;
   (e) for each outer roller slot, an elongated inner roller slot formed in an outer surface of the coupling hub member at the pivot end thereof, each inner roller slot having a semicircular shape in transverse cross section and being aligned overlapping and parallel with a different one of the outer roller slots so as to define a roller receiving space, the aligned inner and outer roller slots remaining overlapped at any pivot angle between the female coupling and coupling hub members up to the maximum pivot angle;
   (f) a torque transmitting roller received in each of the roller receiving spaces, each torque transmitting roller having a spherical shape with a radius substantially the same as the radius of the transverse cross sectional shape of the inner and outer roller slots; and
   (g) sealing means for providing a seal between the female coupling member receptacle and the coupling hub member to protect the central bearing member, torque transmitting rollers, and inner and outer roller slots.

2. The universal joint assembly of claim 1 further comprising:
   (a) a female coupling ball seat mounted within the female coupling member receptacle and having the thrust bearing surface of the female coupling member formed therein;
   (b) a coupling hub ball seat mounted at the pivot end of the coupling hub and having the thrust bearing surface of the coupling hub member formed therein; and
   (c) wherein the central bearing member comprises a spherically shaped member received in a space defined between the coupling hub ball seat and the female coupling ball seat.

3. The universal joint assembly of claim 1 wherein:
   (a) the torque transmitting rollers are substantially spherical in shape; and
   (b) the inner and outer roller slots each have a substantially semi-circular transverse cross sectional shape.

4. The universal joint assembly of claim 1 wherein the sealing means comprises:
   (a) an annular convex spherical seal surface formed on the coupling hub member at the pivot end thereof, said seal surface having a center of curvature coinciding with the coupling axis about which the coupling hub and female coupling members may pivot with respect to each other; and
   (b) an annular seal structure mating and forming a seal with a seal surface of the female coupling receptacle and the coupling hub member spherical seal surface.

5. The universal joint assembly of claim 4 wherein the annular seat structure further comprises:
   (a) an annular seal element having a surface adapted to mate with the coupling hub member spherical seal surface;
   (b) an annular seal retainer for retaining the annular seal element in a sealing relationship with the coupling hub member and for sealing between the annular seal element and female coupling member receptacle seal surface; and
   (c) biasing means for acting between the annular seal retainer and the annular seal element to force the seal element in contact with the coupling hub member spherical seal surface.

6. A transmission assembly within a down-hole mud motor, the transmission assembly comprising:
   (a) a first universal joint connected to a mud motor rotor shaft;
   (b) a second universal joint connected to a mud motor output shaft;
   (c) a center shaft connecting the first and second universal joints;
   (d) a female coupling member in each universal joint having a single receptacle at a first end thereof, the receptacle being aligned co-axially with a female coupling member longitudinal axis and facing away from the direction of fluid flow through the motor;
   (e) a coupling hub member in each universal joint having a pivot end received in the female coupling member receptacle of the respective universal joint;
   (f) central bearing means in each universal joint positioned between the female coupling member and the coupling hub member for providing bearing surfaces between the female coupling and coupling hub members and enabling the female coupling and coupling hub members to pivot up to a maximum pivot angle with respect to each other about a coupling axis;

(g) torque transmitting means in each universal joint acting between the coupling hub member and female coupling member for enabling torque applied to one said member to be applied to the other said member; and (h) sealing means in each universal joint for providing a seal between the female coupling member and the coupling hub member to protect the central bearing means and the torque transmitting means.

7. The transmission assembly of claim 6 wherein the torque transmitting means in each universal joint comprises:

(a) a plurality of torque transmitting rollers;

(b) a plurality of outer roller slots spaced apart about the surface of the female coupling member which defines the receptacle, the outer roller slots each extending substantially parallel to the female coupling member longitudinal axis; and (c) a plurality of inner roller slots formed in an outer surface of the coupling hub member at the pivot end of the coupling hub member, the number of inner roller slots being equal in number to the outer roller slots and each inner roller slot being aligned overlapping and parallel with one of the outer roller slots so that the aligned inner and outer roller slots define a roller receiving space in which one of the torque transmitting rollers is received.

8. The transmission assembly of claim 7 wherein:

(a) the torque transmitting rollers are substantially spherical in shape; and (b) the inner and outer roller slots each have a substantially semi-circular shape in transverse cross section.

9. The transmission assembly of claim 8 wherein the central bearing means of each universal joint comprises:

(a) a female coupling ball seat mounted within the female coupling receptacle and having a semi-spherical concave bearing surface;

(b) a coupling hub ball seat mounted on the coupling hub member at the pivot end thereof and having a semi-spherical concave bearing surface of equal radius with, and facing the bearing surface of the female coupling ball seat; and (c) a spherically shaped bearing member having a radius substantially equal to the radius of the bearing surface of both the coupling hub and female coupling ball seats, and being received in a space defined between said bearing surfaces.

10. The transmission assembly of claim 9 wherein the sealing means comprises:

(a) an annular convex spherical seal surface formed on the coupling hub member, said seal surface having a center of curvature coinciding with the coupling axis about which the coupling hub and female coupling members may pivot with respect to each other;

(b) an annular sealing element mating and forming a seal with the coupling hub member spherical seal surface;

(c) an annular seal carrier received in an annular space between the male coupling member and the female coupling member receptacle surface, the seal carrier, for retaining the annular seal element in place and forming a seal between the annular seal element and the female coupling member; and (d) biasing means between the seal carrier and the annular seal element for biasing the seal element into a sealing contact with the coupling hub member spherical seal surface.

\* \* \* \* \*